(12) United States Patent
Jiang et al.

(10) Patent No.: US 10,135,726 B2
(45) Date of Patent: Nov. 20, 2018

(54) VIRTUALIZATION PORT LAYER INCLUDING PHYSICAL SWITCH PORT AND LOGICAL SWITCH PORT

(71) Applicant: Nicira, Inc., Palo Alto, CA (US)

(72) Inventors: Jingchun Jason Jiang, Beijing (CN); Donghai Han, Beijing (CN)

(73) Assignee: VMware, Inc., Palo Alto, CA (US)

( * ) Notice: Subject to any disclaimer, the term of this patent is extended or adjusted under 35 U.S.C. 154(b) by 57 days.

(21) Appl. No.: 15/336,669

(22) Filed: Oct. 27, 2016

(65) Prior Publication Data

US 2018/0123954 A1    May 3, 2018

(51) Int. Cl.
*H04L 12/715* (2013.01)
*H04L 12/931* (2013.01)
*H04L 12/709* (2013.01)

(52) U.S. Cl.
CPC ............ *H04L 45/64* (2013.01); *H04L 45/245* (2013.01); *H04L 49/70* (2013.01)

(58) Field of Classification Search
CPC .............................. H04L 49/70; H04L 45/245
See application file for complete search history.

(56) References Cited

U.S. PATENT DOCUMENTS

2014/0003442 A1 *  1/2014  Hernandez ............ H04L 12/4641
                                                                370/401

* cited by examiner

*Primary Examiner* — Feben Haile
(74) *Attorney, Agent, or Firm* — Patterson & Sheridan, LLP

(57) ABSTRACT

Aspects of the present disclosure relate to introduction of a physical switch port and logical switch port to the virtualization layer. A virtual network interface card (VNIC) can be associated with a physical switch port that routes traffic to logical switch ports based on a transmit function. The logical switch ports each are associated with a filtering protocol and route traffic to a physical switch port based on a receive function associated with that logical switch port. The logical switch ports can be associated with container running on the virtual machine (VM) connected to the VNIC. Thus, a single VNIC can be shared by multiple containers running different filtering protocols. A single logical port can also route traffic to multiple physical switch ports, each associated with a different VNIC. Thus, a same filtering protocol can be shared by multiple VNICs.

28 Claims, 7 Drawing Sheets

VIRTUALIZATION PORT LAYER INCLUDING PHYSICAL SWITCH PORT AND LOGICAL SWITCH PORT

BACKGROUND

Software-defined networking (SDN) often uses network controllers to configure logical networks throughout a datacenter. In a logical network, one or more virtual machines (VMs) and one or more virtual switches or other virtualized computing instances may be implemented by a virtualization layer (e.g., hypervisor) running on host machines, which are physical computing devices. Each VM may include one or more virtual network interface cards (VNICs) for exchanging traffic with other entities on the logical network. The VNICs may behave similarly to physical NICs (PNICs). Each VNIC may connect to a virtual port of a virtual switch to exchange traffic of the associated VM on the logical network. Each virtual port may be associated with filtering protocols for filtering traffic exchanged on the virtual port. In some cases, it is desirable for traffic from a single VNIC to have multiple different protocols applied. In some cases, it may be desirable for traffic from multiple VNICs to have a same filtering protocol applied.

SUMMARY

Herein described are one or more embodiments of a method for exchanging packets in a virtual data center using one or more physical switch ports and one or more logical switch ports at the virtualization layer. The method generally includes the steps of sending a first one or more data packets from at least a first virtual network interface card (VNIC) of a first virtual machine (VM) to a network location via a virtual switch comprising one or more physical switch ports and one or more logical switch ports, wherein the sending comprises sending the first one or more data packets to one of the physical switch ports associated with the VNIC, wherein the one of the physical switch ports forwards the first one or more data packets to one or more of the logical switch ports according to a transmit function associated with the physical switch port, and wherein each of the one or more logical switch ports applies a filtering protocol associated with that logical switch port; and receiving a second one or more data packets via the virtual switch, wherein the receiving comprises receiving the second one or more data packets from the network location at one of the logical switch ports, wherein the one of the logical switch ports applies a filtering protocol associated with that logical switch port and forwards the one or more data packets to one or more of the physical switch ports according to a receive function associated with the logical switch port.

Also described herein are embodiments of a non-transitory computer-readable storage medium storing instructions that, when executed by a computer system, cause the computer system to perform the method described above for exchanging packets in a virtual data center using one or more physical switch ports and one or more logical switch ports at the virtualization layer Also described herein are embodiments of a computer system programmed to carry out the method described above for exchanging packets in a virtual data center using one or more physical switch ports and one or more logical switch ports at the virtualization layer.

DETAILED DESCRIPTION

Embodiments presented herein relate to a virtual switch including one or more physical switch ports and one or more logical switch ports for exchanging traffic (e.g., one or more packets) in a logical network. Accordingly, multiple different filtering protocols can be applied for traffic of a single VNIC/VM and traffic from multiple VNICs/VMs can have the same filtering protocol applied as further described below.

As used herein, the term "packet" may refer generally to a group of bits that can be transported together, and may be in another form, such as "frame", "message", "segment", etc. In some embodiments, the packet may include a payload (e.g., data) and header information, such as a source address corresponding to the address of the network location that generated the packet, a source port corresponding to the port of the network location that generated the packet, a destination address corresponding to the address of the destination location, a destination port corresponding to the port of the destination location, and/or a protocol used for the packet.

Figure 1:
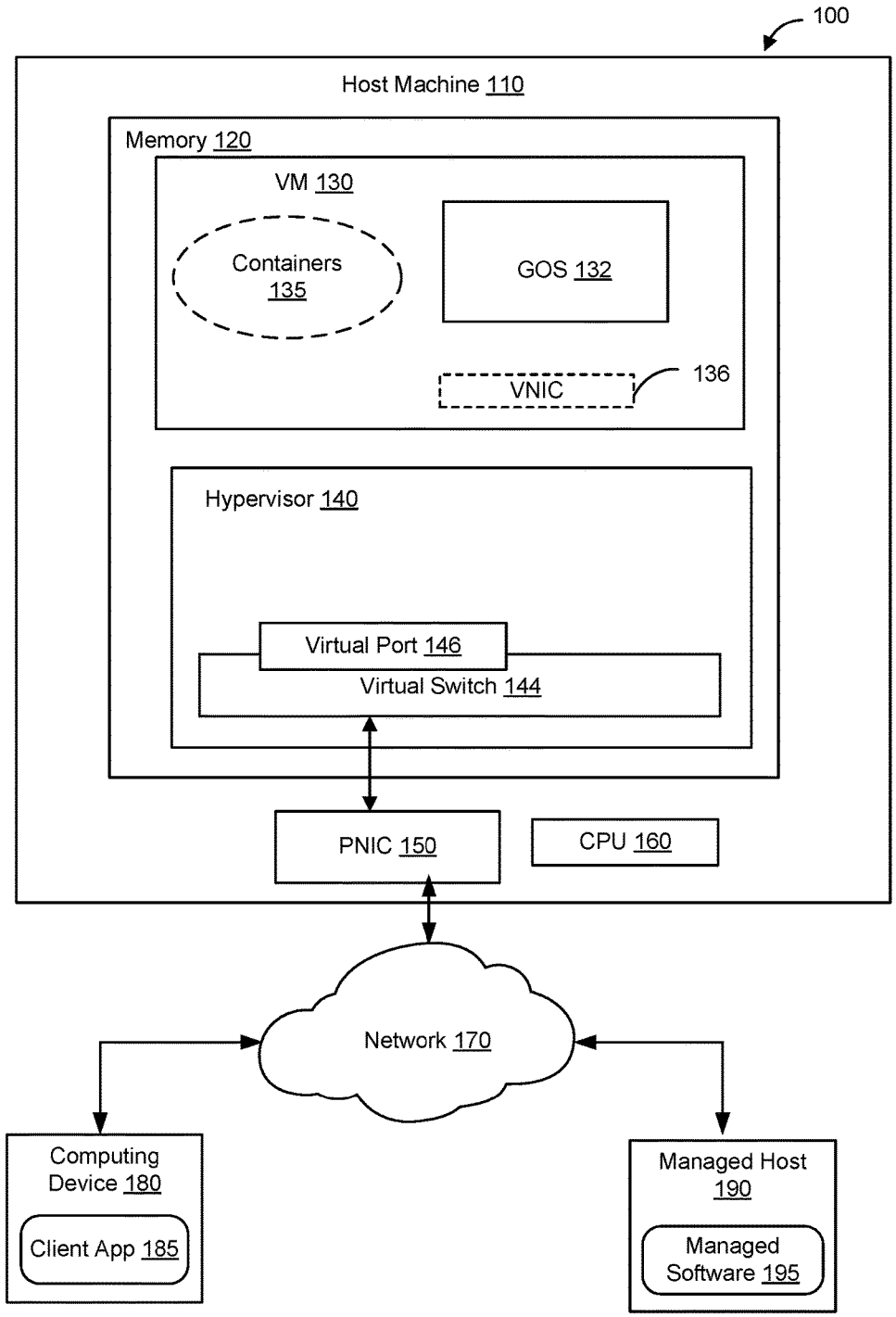
FIG. 1 illustrates components of a system in which an embodiment may be implemented.

FIG. 1 illustrates components of a system 100 in which an embodiment may be implemented. As shown, system 100 is a virtualized environment that includes host machine 110, a network 170, a managed host 190, and a computing device 180. In some embodiments, host machine 110 may be constructed on conventional hardware platforms that include one or more central processing units shown as CPU 160, memory 120, and physical network interface controllers shown as PNIC 150. CPU 160 may execute instructions stored in memory 120 that perform one or more operations described herein. Memory 120 may include, for example, one or more random access memory (RAM) modules. Although a single host machine 110, a single managed host 190, and a single computing device 180 are depicted, it should be understood that a virtualized environment may generally include any number of such devices or may not include certain such devices.

Managed host 190 can be configured similarly to host machine 110. Managed software 195 can include hypervisors, VMs, guest OS, containers, OS, and the like, as well as applications. Computing device 180 can execute a client application 185. Computing device 180 can include a computer, laptop, tablet, mobile device, or the like. Client application 185 can communicate using application programming interface (API) commands.

Network 170 can include various physical routers, switches, and like network appliances that facilitate communication between host machine 110, managed host 190, and computing device 180.

Host machine 110 may execute a virtualization layer shown as hypervisor 140 that is stored in memory 120. Hypervisor 140 may further implement a VM 130. Hypervisor 140 abstracts processor, memory, storage, and/or networking resources into multiple virtual machines (e.g., VM 130) that run side-by-side on the same physical host machine 110. That is, the hypervisor 140 partitions physical host machine 110 into multiple secure and portable virtual machines. Each virtual machine represents a complete system—with processors, memory, networking, storage, and/or BIOS. In one embodiment, hypervisor 140 can be installed directly on host machine 110 and inserts a virtualization layer between the hardware and the operating system. Alternatively, the hypervisor 140 may run on top of a conventional operating system in host machine 110. Though only one VM 130 is shown in host machine 110, host machine 110 may run multiple such VMs 130.

One example of hypervisor 140 that may be used in an embodiment described herein is a hypervisor provided as part of the VMware vSphere® solution made commercially available from VMware, Inc. of Palo Alto, Calif.

In some embodiments, VM 130 executes a guest operating system (OS) 132. Guest OS 132 can be any commodity operating system known in the art. As shown, VM 130 includes one or more containers 135. Containers 135 implement operating system-level virtualization, wherein an abstraction layer is provided on top of the kernel of the OS. The abstraction layer supports multiple containers each including an application and its dependencies. Containers 135 do not include a guest OS and are sometimes referred to as "OS-less containers." Each container runs as an isolated process in userspace and shares the kernel with other containers. The container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and containers. The term "virtualization layer" as used herein is mean to encompass both a hypervisor and an operating system kernel supporting containers.

VM 130 includes a software-based virtual network adapter shown as VNIC 136 that is logically connected to a physical network adapter shown as PNIC 150 included in machine 110 that provides network access for the VM 130. VNIC 136 is connected to PNIC 150 through a software-based "switch," shown as virtual switch 144 implemented by hypervisor 140. In some cases, although not shown, virtual switch 144 can be distributed across multiple host machines 110.

Virtual switch 144 includes a virtual port 146 as an interface between PNIC 150 and VNIC 136. Typically, VNIC 136 is connected to one virtual port 146 that applies one set (e.g., suite) of filtering protocols (e.g., filter policies). In some cases, it may be desirable for traffic from one VNIC 136 to have multiple different sets of filtering protocols applied. For example, in the case that the VM 130 has multiple containers 135 running within it, different sets of filtering protocols (e.g., for desired security, statistics, mirroring, firewall policies, etc.) may be desired for traffic of different containers 135. In some cases, it may be desirable for the same filtering protocol to be applied for traffic from multiple VNICs. Each container 135 within the VM 130 typically shares the same VNIC 136, and therefore, the same virtual port 146 with one set of filtering protocols. In order to enable separate filtering protocols for each container 135, VM 130 may need to implement separate VNICs 136 for each container 135 that connect to different virtual ports 146 on virtual switch 144. VNICs 136 would then need to be grouped together and traffic flow redirected to or from VNICs 136 using bridge functions. This approach may be inflexible and waste memory, since separate VNICs 136 are created.

Accordingly, embodiments herein provide techniques for implementing a virtual port as one or more physical switch ports and one or more logical switch ports in a virtual switch. For example, such techniques may be used for allowing multiple filtering protocols to be applied for a single VNIC and/or for allowing multiple VNIC to apply a same filtering protocol.

Figure 2:
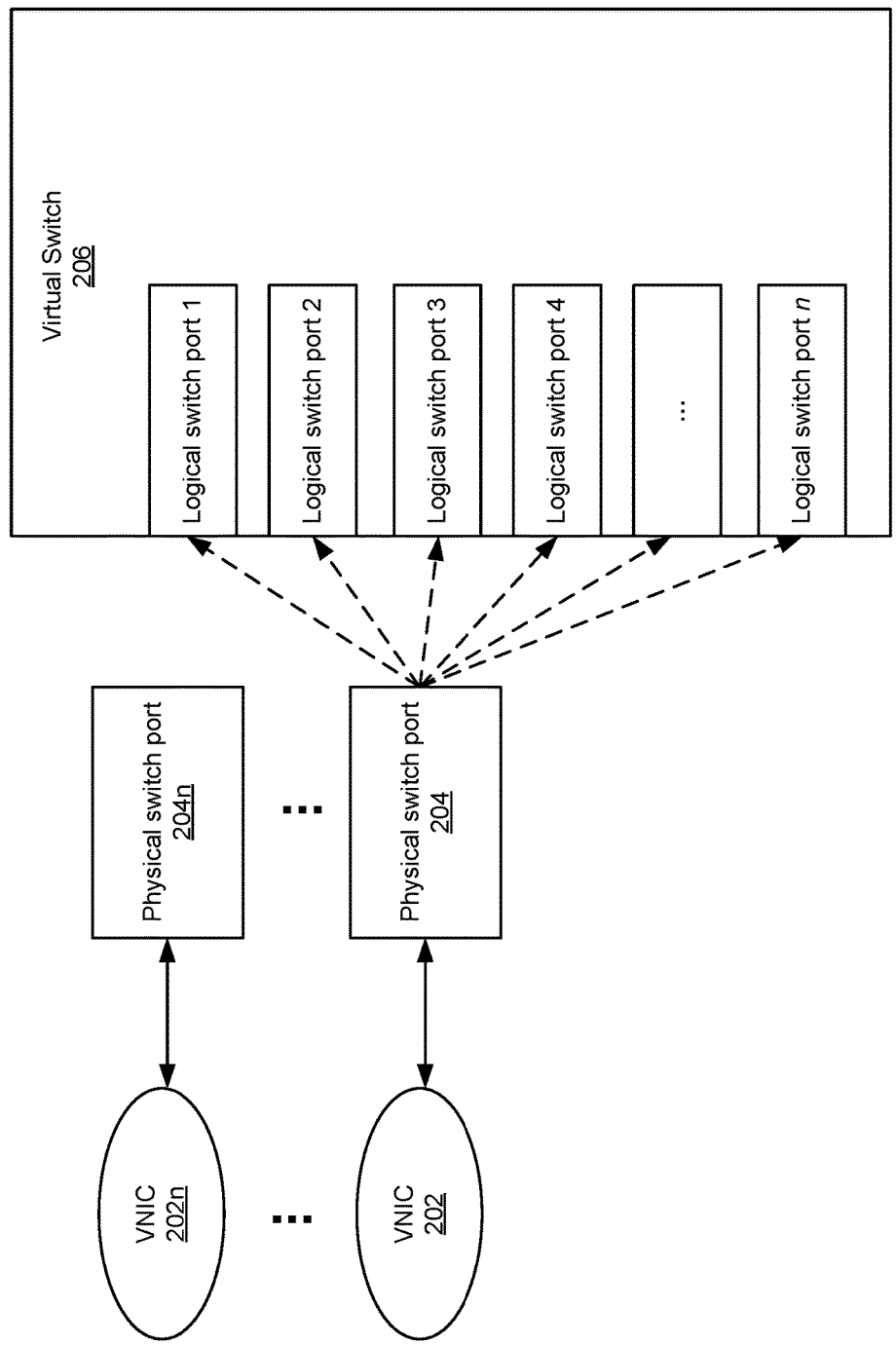
FIG. 2 is a block diagram of a VNIC connected to a single virtual port of a virtual switch, according to an embodiment.

FIG. 2 is a block diagram of a VNIC 202 connected to a single virtual port of a virtual switch 206, according to an embodiment. As shown the single virtual port (e.g., such as virtual port 146) includes a physical switch port 204 and one or more logical switch ports 1 . . . n. Physical switch port 204 is connected to a single NIC, such as VNIC 202 (or a PNIC 150). The logical switch ports each implement a set of filtering protocols. In some embodiments, each different logical switch port 1 . . . n can be associated with one or more different containers 135. Accordingly, the virtual port can be associated with one or more different containers 135, but the same VNIC 202 via the physical switch port 204 and logical switch ports 1 . . . n. Therefore, traffic (e.g., of different containers 135) sent from one VNIC 202 can be routed to different logical switch ports that apply different sets of filtering protocols to the traffic.

Figure 3:
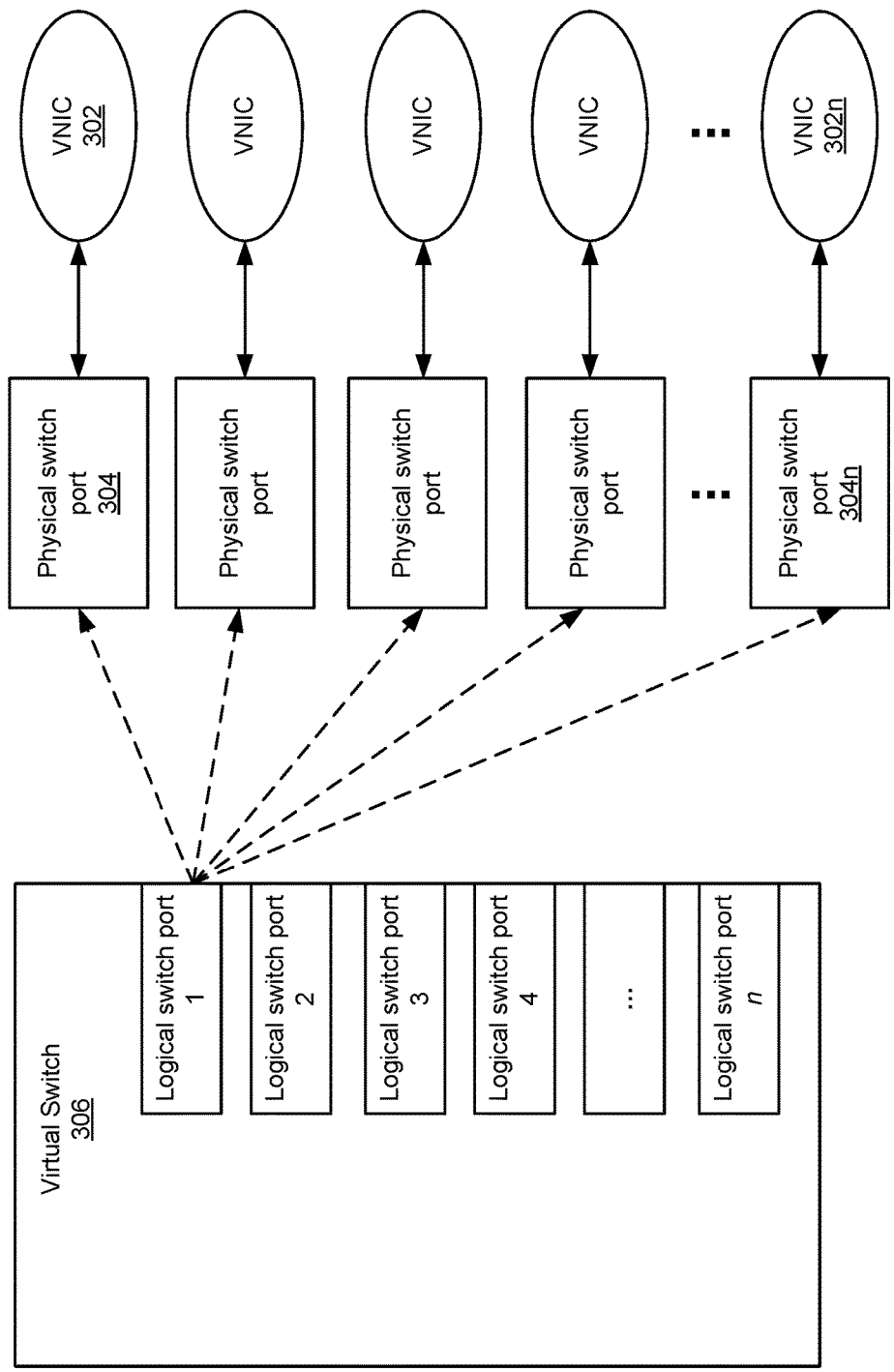
FIG. 3 is a block diagram of multiple VNICs each connected to a single virtual port of a virtual switch that includes multiple physical switch ports, according to an embodiment.

FIG. 3 is a block diagram of multiple VNICs 302 each connected to a single virtual port of a virtual switch 306 that includes multiple physical switch ports 304 . . . 304n and a shared logical switch port 1, according to an embodiment. Logical switch port 1 can route traffic over multiple physical switch ports 304 . . . 304n. Each physical switch port 304 is connected to a separate VNIC 302 . . . 302n. Thus, the same filtering protocol applied by logical switch port 1 can be applied across multiple VNICs 302 . . . 302n.

In embodiments, two functions can be used for routing packets between the physical switch ports and logical switch ports. A transmit function (TxFn) can be used at the physical switch port to determine which logical switch ports to forward traffic to for transmitting traffic from a VNIC. For example, the TxFn may store information indicating which packets should go to which logical switch ports, such as a mapping of header information (e.g., one or more Internet protocol (IP) addresses) included in packets to logical switch ports. The header information may indicate which VM/container a packet is associated with. The TxFn can determine which logical switch ports to forward the traffic using the mapping and the header information in the packets. A receive function (RxFn) can be used at the logical switch port to determine which physical switch ports to forward traffic to for receiving traffic for a VNIC. For example, the RxFN, like the TxFN, may store information mapping header information in packets to physical switch ports. The RxFn can determine which physical switch ports to forward the traffic to using the mapping and the header information in the packets. Each physical switch port has at least one logical switch port associated. A logical switch port, on the other hand, may not have an associated physical switch port.

Figure 4:
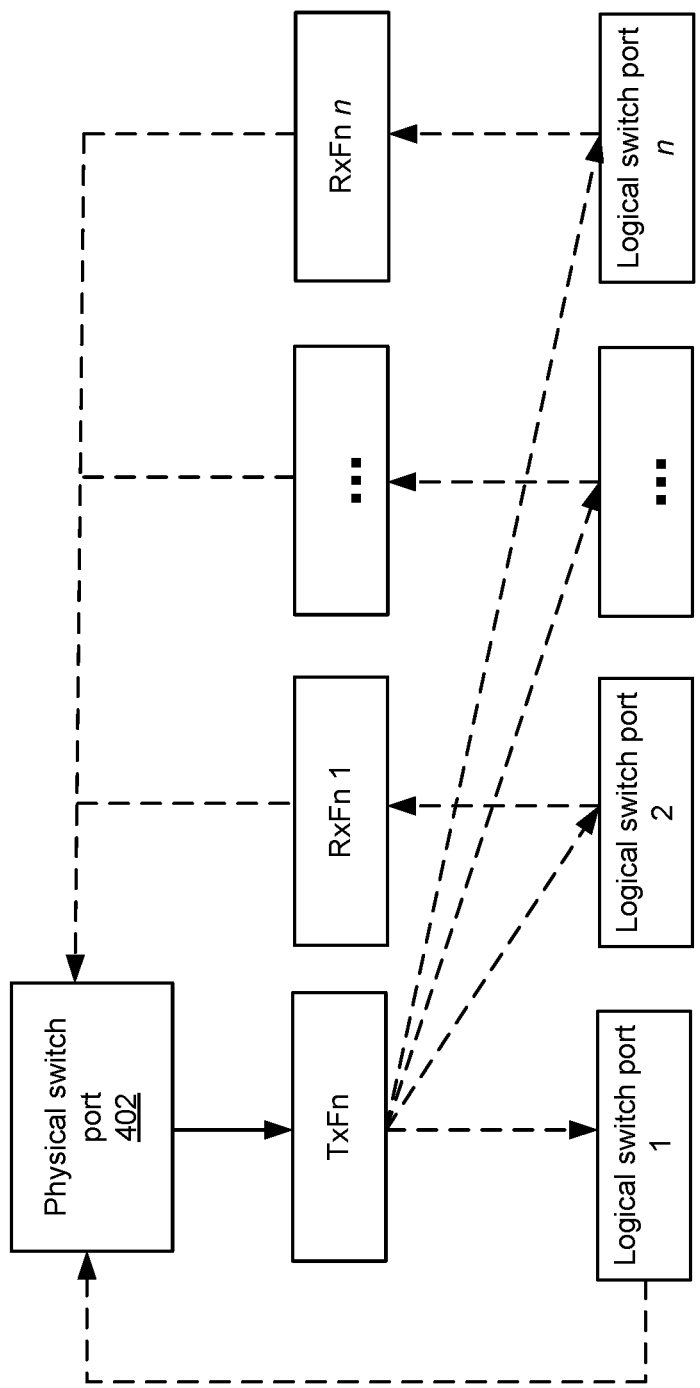
FIG. 4 is a block diagram illustrating a virtual port including a physical and logical switch ports, according to an embodiment.

FIG. 4 is a block diagram illustrating a virtual port including a physical switch port 402 and logical switch ports 1 . . . n, according to an embodiment. Physical switch port 402 forwards traffic to any of the logical switch ports 1 . . . n according to the TxFN associated with the physical switch port. Physical switch port 402 receives traffic forwarded from any of the logical switch ports 1 . . . n according to the RxFn 1 . . . n associated with the respective logical switch port.

Figure 5:
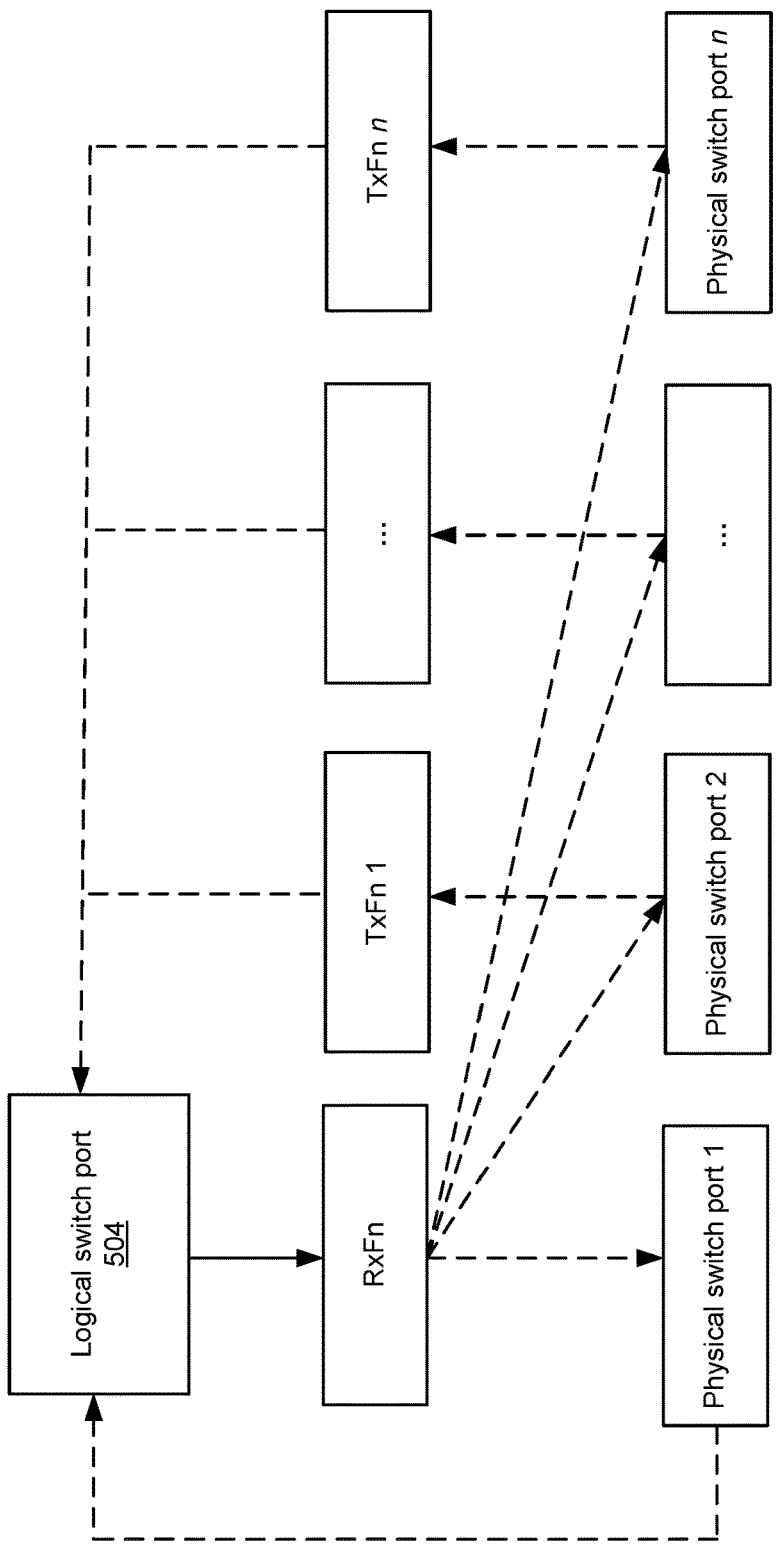
FIG. 5 is a block diagram illustrating a virtual port including a logical switch port and physical switch ports, according to an embodiment.

FIG. 5 is a block diagram illustrating a virtual port including a logical switch port 504 and physical switch ports 1 . . . n, according to an embodiment. Logical switch port 504 forwards traffic to any of the physical switch ports 1 . . . n according to the RxFn associated with the logical switch port. Logical switch port 504 receives traffic forwarded from any of the physical switch ports 1 . . . n according to the TxFn 1 . . . n associated with the respective physical switch port.

Figure 6:
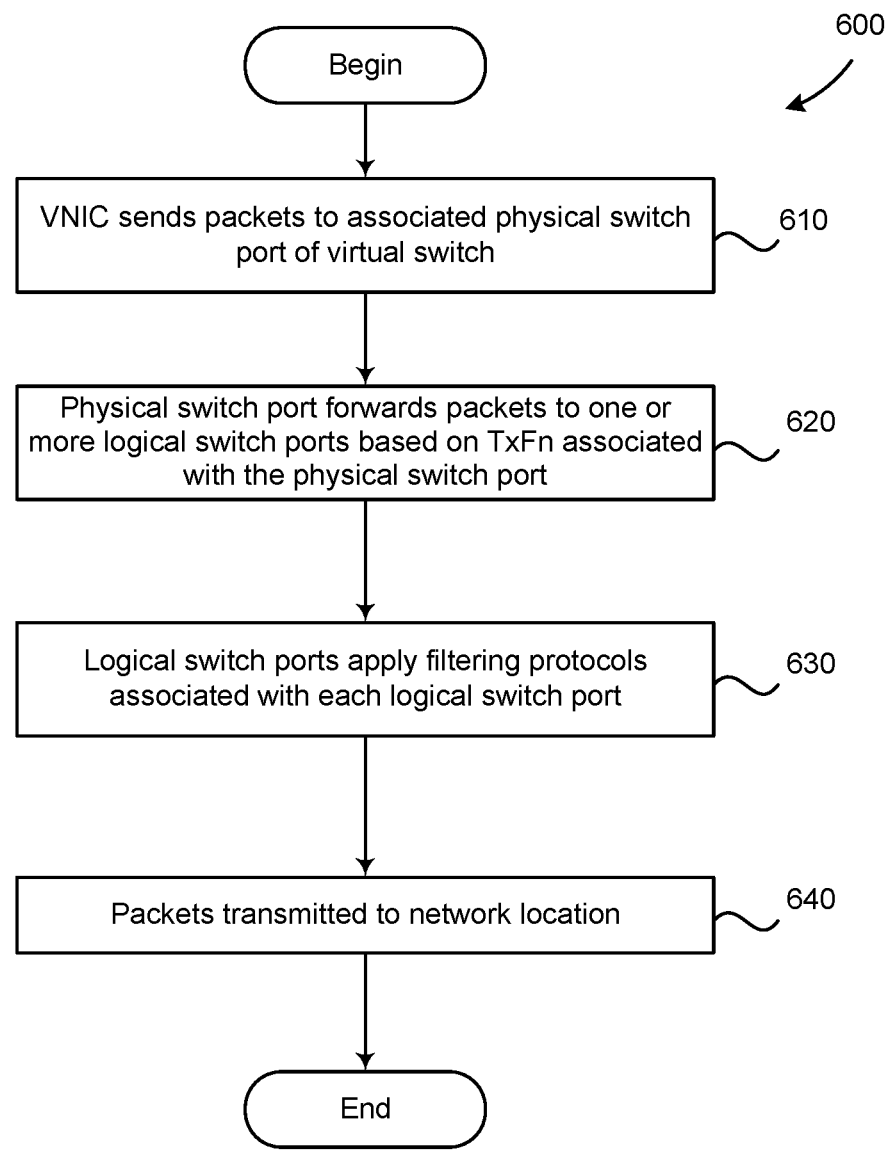
FIG. 6 is a flow diagram illustrating example operations performed by a virtual switch for exchanging packets in a logical network, according to an embodiment.

FIG. 6 illustrates example operations 600 for exchanging packets in a logical network, according to an embodiment. The operations 600 may be performed, for example, at a virtual switch (e.g., such as virtual switch 144) by a hypervisor (e.g., such as hypervisor 140). The operations 600 begin, at 610, by a VNIC sending packets to a physical switch port associated with the VNIC. At 620, the physical switch port forwards the packets to one or more logical switch ports based on a TxFn associated with the physical switch port. At 630, the logical switch ports apply filtering protocols associated with the respective logical switch port. At 640, the packets are transmitted to a network location.

Figure 7:
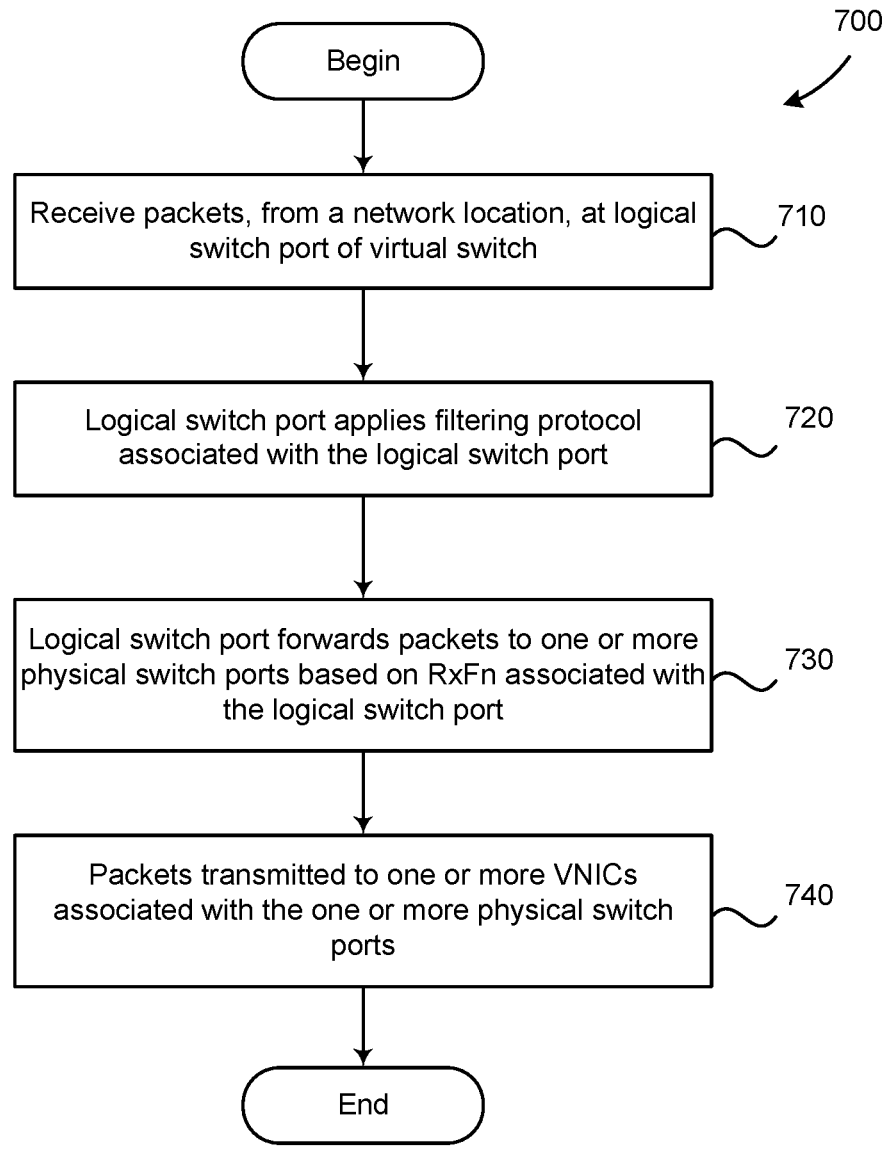
FIG. 7 is a flow diagram illustrating example operations performed by a virtual switch for exchanging packets in a logical network, according to an embodiment.

FIG. 7 illustrates example operations 700 for exchanging packets in a logical network, according to an embodiment. The operations 700 may be performed, for example, at a virtual switch (e.g., such as virtual switch 144) by a hypervisor (e.g., such as hypervisor 140). The operations 700 begin, at 710, by receiving packets from a network location. At 720, the logical switch port applies the filtering protocol associated with the logical switch port. At 730, the logical switch port forwards the packet to one or more physical switch ports based on the RxFn associated with the logical switch port. At 740, the packets are transmitted to one or more VNICs associated with the one or more physical ports.

Currently, a link aggregation control protocol (LACP) link aggregation group (LAG) does not have a port associated with a LAG. In an embodiment, a LAG can be associated with a single logical switch port that applies a single set of filtering protocols. Each PNIC of the LAG (e.g., a group of PNICs) is further connected to a different physical switch port. Each PNIC may have a different physical configuration, such as different hardware rings, different hardware offloading, etc. Accordingly, a LAG can act as a single physical switch.

In an embodiment, some internal ports do not have a VNIC connected. In this case, the logical switch ports are directly connected to these internal ports.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for exchanging packets in a virtual data center, the method comprising:
   providing a first one or more data packets from a first virtual machine (VM) running on a host machine to a network location via a virtual switch running on the host machine, wherein a first virtual network interface card (VNIC) of the first VM is coupled to a virtual port of the virtual switch, the virtual port comprising a physical port of the virtual switch associated with one or more of a plurality of logical switch ports of the virtual switch, wherein the providing comprises:
      providing the first one or more data packets to the physical port via the first VNIC;
      selecting at the physical port, based on header information of the first one or more data packets, a logical switch port of the plurality of logical switch ports, each of the plurality of logical switch ports associated with a corresponding filtering protocol;
      forwarding the first one or more data packets from the physical port to the selected logical switch port;
      applying at the selected logical switch port the corresponding filtering protocol to the first one or more data packets; and
      selectively forwarding the first one or more data packets from the selected logical switch port to the network location based on the applied corresponding filtering protocol; and
   obtaining a second one or more data packets at the first VM, wherein the obtaining comprises:
      obtaining the second one or more data packets at one of the plurality of logical switch ports;
      applying at the one of the plurality of logical switch ports the corresponding filtering protocol; and
      selectively forwarding, based on header information of the second one or more data packets and the applied corresponding filtering protocol, the second one or more data packets to the physical port.

2. The method of claim 1, further comprising:
   providing a third one or more data packets to the physical port via the first VNIC;
   selecting at the physical port, based on header information of the third one or more data packets, a second logical switch port of the plurality of logical switch ports;
   forwarding the third one or more data packets from the physical port to the second logical switch port;
   applying at the second logical switch port the corresponding filtering protocol to the third one or more data packets; and
   selectively forwarding the third one or more data packets from the second logical switch port based on the applied corresponding filtering protocol.

3. The method of claim 2, wherein the first and second logical switch ports apply different filtering protocols.

4. The method of claim 1, wherein one or more of the plurality of logical switch ports are associated with different containers running on the first VM.

5. The method of claim 1, further comprising:
   obtaining a fourth one or more data packets at the one of the plurality of logical switch ports;
   applying at the one of the plurality of logical switch ports the corresponding filtering protocol; and
   selectively forwarding, based on header information of the fourth one or more data packets and the applied corresponding filtering protocol, the fourth one or more data packet to a second physical port of a second virtual port of the virtual switch.

6. The method of claim 1, wherein the filtering protocols are based on at least one of: a desired security for the virtual data center, statistics, or mirroring.

7. The method of claim 1, wherein a set of the physical switch ports of the virtual switch are associated with a set of physical network interface cards (PNICs) comprising a link aggregation group (LAG), and wherein the LAG is associated with a single logical switch port of the plurality of logical switch ports.

8. A non-transitory computer readable medium comprising instructions to be executed in a computer system, wherein the instructions when executed in the computer system perform a method for exchanging packets in a virtual data center, the method comprising:
   providing a first one or more data packets from a first virtual machine (VM) running on a host machine to a network location via a virtual switch running on the host machine, wherein a first virtual network interface card (VNIC) of the first VM is coupled to a virtual port of the virtual switch, the virtual port comprising a physical port of the virtual switch associated with one or more of a plurality of logical switch ports of the virtual switch, wherein the providing comprises:
  providing the first one or more data packets to the physical port via the first VNIC;
  selecting at the physical port, based on header information of the first one or more data packets, a logical switch port of the plurality of logical switch ports, each of the plurality of logical switch ports associated with a corresponding filtering protocol;
  forwarding the first one or more data packets from the physical port to the selected logical switch port;
  applying at the selected logical switch port the corresponding filtering protocol to the first one or more data packets; and
  selectively forwarding the first one or more data packets from the selected logical switch port to the network location based on the applied corresponding filtering protocol; and
obtaining a second one or more data packets at the first VM, wherein the obtaining comprises:
  obtaining the second one or more data packets at one of the plurality of logical switch ports;
  applying at the one of the plurality of logical switch ports the corresponding filtering protocol; and
  selectively forwarding, based on header information of the second one or more data packets and the applied corresponding filtering protocol, the second one or more data packets to the physical port.

9. The non-transitory computer readable medium of claim 8, the method further comprising:
  providing a third one or more data packets from the physical port via the first VNIC;
  selecting at the physical port, based on header information of the third one or more data packets, a second logical switch port of the plurality of logical switch ports;
  forwarding the third one or more data packets from the physical port to the second logical switch port;
  applying at the second logical switch port the corresponding filtering protocol to the third one or more data packets; and
  selectively forwarding the third one or more data packets from the second logical switch port based on the applied corresponding filtering protocol.

10. The non-transitory computer readable medium of claim 9, wherein the first and second logical switch ports apply different filtering protocols.

11. The non-transitory computer readable medium of claim 8, wherein one or more of the plurality of logical switch ports are associated with different containers running on the first VM.

12. The non-transitory computer readable medium of claim 8, the method further comprising:
  obtaining a fourth one or more data packets at the one of the plurality of logical switch ports;
  applying at the one of the plurality of logical switch ports the corresponding filtering protocol; and
  selectively forwarding, based on header information of the fourth one or more data packets and the applied corresponding filtering protocol, the fourth one or more data packet to a second physical port of a second virtual port of the virtual switch.

13. The non-transitory computer readable medium of claim 8, wherein the filtering protocols are based on at least one of: a desired security for the virtual data center, statistics, or mirroring.

14. The non-transitory computer readable medium of claim 8, wherein a set of the physical switch ports of the virtual switch are associated with a set of physical network interface cards (PNICs) comprising a link aggregation group (LAG), and wherein the LAG is associated with a single logical switch port of the plurality of logical switch ports.

15. A computer system comprising a memory and a processor, wherein the processor configured to perform a method for exchanging packets in a virtual data center, the method comprising:
  providing a first one or more data packets from a first virtual machine (VM) running on a host machine to a network location via a virtual switch running on the host machine, wherein a first virtual network interface card (VNIC) of the first VM is coupled to a virtual port of the virtual switch, the virtual port comprising a physical port of the virtual switch associated with one or more of a plurality of logical switch ports of the virtual switch, wherein the providing comprises:
    providing the first one or more data packets to the physical port via the first VNIC;
    selecting at the physical port, based on header information of the first one or more data packets, a logical switch port of the plurality of logical switch ports, each of the plurality of logical switch ports associated with a corresponding filtering protocol;
    forwarding the first one or more data packets from the physical port to the selected logical switch port;
    applying at the selected logical switch port the corresponding filtering protocol to the first one or more data packets; and
    selectively forwarding the first one or more data packets from the selected logical switch port to the network location based on the applied corresponding filtering protocol; and obtaining a second one or more data packets at the first VM, wherein the obtaining comprises:
    obtaining the second one or more data packets at one of the plurality of logical switch ports;
    applying at the one of the plurality of logical switch ports the corresponding filtering protocol, and selectively forwarding, based on header information of the second one or more data packets and the applied corresponding filtering protocol the second one or more data packets to the physical port.

16. The computer system of claim 15, the processor configured to perform the method further comprising:
  providing a third one or more data packets from the physical port via the first VNIC;
  selecting at the physical port, based on header information of the third one or more data packets, a second logical switch port of the plurality of logical switch ports;
  forwarding the third one or more data packets from the physical port to the second logical switch port;
  applying at the second logical switch port the corresponding filtering protocol to the third one or more data packets; and
  selectively forwarding the third one or more data packets from the second logical switch port based on the applied corresponding filtering protocol.

17. The computer system of claim 16, wherein the first and second logical switch ports apply different filtering protocols.

18. The computer system of claim 15, wherein one or more of the plurality of logical switch ports are associated with different containers running on the first VM.

19. The computer system of claim 15, the processor configured to perform the method further comprising:

obtaining a fourth one or more data packets at the one of the plurality of logical switch ports;
applying at the one of the plurality of logical switch ports the corresponding filtering protocol; and
selectively forwarding, based on header information of the fourth one or more data packets and the applied corresponding filtering protocol, the fourth one or more data packet to a second physical port of a second virtual port of the virtual switch.

20. The computer system of claim 15, wherein the filtering protocols are based on at least one of: a desired security for the virtual data center, statistics, or mirroring.

21. The computer system of claim 15, wherein a set of the physical switch ports of the virtual switch are associated with a set of physical network interface cards (PNICs) comprising a link aggregation group (LAG), and wherein the LAG is associated with a single logical switch port of the plurality of logical switch ports.

22. A computer system comprising:
means for providing a first one or more data packets from a first virtual machine (VM) running on a host machine to a network location via a virtual switch running on the host machine, wherein a first virtual network interface card (VNIC) of the first VM is coupled to a virtual port of the virtual switch, the virtual port comprising a physical port of the virtual switch associated with one or more of a plurality of logical switch ports of the virtual switch, wherein the providing comprises:
providing the first one or more data packets to the physical port via the first VNIC;
selecting at the physical port, based on header information of the first one or more data packets, a logical switch port of the plurality of logical switch ports, each of the plurality of logical switch ports associated with a corresponding filtering protocol;
forwarding the first one or more data packets from the physical port to the selected logical switch port;
applying at the selected logical switch port the corresponding filtering protocol to the first one or more data packets; and
selectively forwarding the first one or more data packets from the selected logical switch port to the network location based on the applied corresponding filtering protocol; and
means for obtaining a second one or more data packets at the first VM, wherein the obtaining comprises:
obtaining the second one or more data packets at one of the plurality of logical switch ports;
applying at the one of the plurality of logical switch ports the corresponding filtering protocol; and
selectively forwarding, based on header information of the second one or more data packets and the applied corresponding filtering protocol, the second one or more data packets to the physical port.

23. The computer system of claim 22, further comprising:
means for providing a third one or more data packets from the physical port via the first VNIC;
means for selecting at the physical port, based on header information of the third one or more data packets, a second logical switch port of the plurality of logical switch ports;
forwarding the third one or more data packets from the physical port to the second logical switch port;
means for applying at the second logical switch port the corresponding filtering protocol to the third one or more data packets; and
means for selectively forwarding the third one or more data packets from the second logical switch port based on the applied corresponding filtering protocol.

24. The computer system of claim 23, wherein the first and second logical switch ports apply different filtering protocols.

25. The computer system of claim 22, wherein one or more of the plurality of logical switch ports are associated with different containers running on the first VM.

26. The computer system of claim 22, further comprising:
means for obtaining a fourth one or more data packets at the one of the plurality of logical switch ports;
means for applying at the one of the plurality of logical switch ports the corresponding filtering protocol; and
means for selectively forwarding, based on header information of the fourth one or more data packets and the applied corresponding filtering protocol, the fourth one or more data packet to a second physical port of a second virtual port of the virtual switch.

27. The computer system of claim 22, wherein the filtering protocols are based on at least one of: a desired security for the virtual data center, statistics, or mirroring.

28. The computer system of claim 22, wherein a set of the physical switch ports of the virtual switch are associated with a set of physical network interface cards (PNICs) comprising a link aggregation group (LAG), and wherein the LAG is associated with a single logical switch port of the plurality of logical switch ports.

* * * * *